United States Patent [19]

Demarest, Jr.

[11] Patent Number: 4,519,814
[45] Date of Patent: May 28, 1985

[54] TWO STAGE BATCH LIQUEFACTION PROCESS AND APPARATUS

[75] Inventor: Henry M. Demarest, Jr., Natrona Heights, Pa.

[73] Assignee: PPG Industries, Inc., Pittsburgh, Pa.

[21] Appl. No.: 516,817

[22] Filed: Jul. 25, 1983

[51] Int. Cl.³ ............................ C03B 1/00; C03B 3/00
[52] U.S. Cl. ........................................ 65/27; 65/136; 65/137; 65/335; 65/337; 432/13; 432/117
[58] Field of Search ................. 65/136, 137, 337, 347, 65/27, 335; 432/13, 117

[56] References Cited

U.S. PATENT DOCUMENTS

| | | | |
|---|---|---|---|
| 2,007,755 | 7/1935 | Ferguson | 65/337 X |
| 2,878,004 | 3/1959 | Saeman | 65/27 |
| 3,082,102 | 3/1963 | Cole et al. | 106/52 |
| 3,116,055 | 12/1963 | Pixley et al. | 263/32 |
| 3,508,742 | 4/1970 | Minegishi | 263/32 |
| 3,573,887 | 4/1971 | Mod et al. | 65/18 |
| 3,607,190 | 9/1971 | Penberthy | 65/134 |
| 4,110,097 | 8/1978 | Chevallier et al. | 65/136 |
| 4,185,984 | 1/1980 | Kiyonaga | 65/337 X |
| 4,238,217 | 12/1980 | Stepanek et al. | 65/335 |
| 4,381,934 | 5/1983 | Kunkle et al. | 65/135 |

OTHER PUBLICATIONS

Backhurst, J. R., and Harker, J. H., "Energy Recovery in Glass Manufacture," *Glass Technology*, vol. 23, No. 1, Feb. 1982.

*Primary Examiner*—Arthur Kellogg
*Attorney, Agent, or Firm*—Dennis G. Millman

[57] ABSTRACT

Liquefying of pulverulent batch materials (e.g., glass batch) is carried out in two stages. The first stage utilizes extended gas/solid contact to heat the materials to an intermediate temperature, and may recover waste heat. The second stage rapidly liquefies the material in a cavity lined with the batch material, and may employ substantially nitrogen-free heat sources. Another aspect involves maintaining a wet condition in the first stage to entrap particulates.

45 Claims, 4 Drawing Figures

TWO STAGE BATCH LIQUEFACTION PROCESS AND APPARATUS

This invention relates to converting pulverulent raw materials into a liquefied state as a first step in a melting process. The invention is particularly applicable to melting glass, including flat glass, container glass, fiber glass and sodium silicate glass. But the invention is applicable to other processes that involve thermally converting a generally flowable, essentially solid state feed material into a molten fluid. These other processes may include metallurgical smelting type operations and fusing of single or multiple component ceramics, metals or other materials.

It has long been recognized that exhaust gas from a combustion heated glass melting furnace or other melting process furnace contains large amounts of thermal energy that can be recovered to improve the overall efficiency of the process. Conventionally, regenerators and recuperators have been employed to recover heat from melting process furnaces but their efficiency is less than would be desired. Furthermore, regenerators and recuperators are large, costly and susceptible to deterioration. Instead of preheating combustion air by way of regenerators or recuperators, it has been proposed to recover waste heat by means of the feed material. These proposals have been hampered by the fact that some particulate feed materials tend to become entrained in the exhaust gas stream. To overcome this problem, it has been proposed to agglomerate (e.g., pelletize) fine feed materials and to contact the agglomerated feed materials with the exhaust gas stream. However, it has been found that the cost of agglomerating feed materials can significantly diminish the economic advantages of heat recovery, and in some cases the entrainment of particulates is not entirely avoided by the use of agglomerated batch materials. Accordingly, one aspect of the present invention relates to recovering waste heat by preheating the batch materials while avoiding the drawbacks described above.

Dusting of dry pulverulent batch materials is also a problem when feeding the batch materials to a conventional melting furnace. It is a common expedient to overcome this problem by wetting the batch (e.g., with water). But, preheating the batch to any significant extent precludes maintaining the batch in a wetted condition.

Although waste heat from melting furnaces is often available at temperatures that could effect useful reactions in the batch materials, preheating of batch materials is often limited to lower temperatures because at higher temperatures the onset of melting of some batch materials can lead to clogging of the preheating apparatus. For example, it would be desirable to convert the carbonate batch materials typically employed in commercial glass melting operations to the respective oxides by preheating the batch to the calcining temperature of the materials, but heretofore, preheating has been generally considered limited to the relatively low melting temperature of the sodium carbonate component of the batch thereby precluding calcining of the calcium carbonate and magnesium carbonate constituents. Another aspect of the invention deals with overcoming this problem.

In U.S. Pat. No. 4,381,934 of Kunkle and Matesa there is disclosed an intensified batch liquefying process in which large volumes of batch are efficiently liquefied in a relatively small space. This type of process, particularly when using intensified heat sources, produces relatively small volumes of exhaust gases, but it would be desirable to recover the heat from the exhaust gases to further improve the efficiency of such processes. It would be particularly desirable to recover the heat directly into the batch feed stream.

In melting pulverulent materials, gases can become entrapped in the molten product, and the presence of gaseous inclusions may be considered undesirable, particularly in the case of transparent glass. Elimination of certain gases from the molten material may be more difficult than others (e.g., nitrogen in the case of molten glass). It would be highly desirable to eliminate these gases from the batch as part of a batch pretreatment so that they do not become subsequently entrapped in the melt.

U.S. Pat. Nos. 3,508,742 and 3,607,190 show direct preheating of glass batch materials. Both maintain temperatures below that at which calcining takes place. U.S. Pat. No. 3,082,102 discloses prereacting pellets of glass batch and indicates that temperatures should be maintained below those at which sintering of the materials takes place.

SUMMARY OF THE INVENTION

In the present invention, waste heat from a combustion fired melting process is recovered by passing the exhaust gas stream into direct contact with loose batch materials being fed to the melting process. In one aspect of the invention, carbonate containing batch materials are preheated to a calcining temperature so as to decompose the carbonates to oxides in the absence of relatively low melting temperature constituents of the batch which are fed in a separate stream to the melter. In a soda-lime glass melting operation, the materials subjected to the calcining preheating include limestone and/or dolomite, whereas the sodium source, such as soda ash and/or caustic soda, would bypass the calcining preheating. Sand may also be included in the portion of batch that is preheated to calcining temperatures. In the preferred embodiments, the combining of the batch portions is completed by a melting vessel that provides active mixing of the separate feed streams.

Another aspect of the invention deals with the problem of particulate batch materials being entrained in an exhaust gas stream when heat is being recovered by direct contact therebetween. By providing sufficient countercurrent contact between the exhaust gas and the batch materials, the temperature of the exhaust gas can be reduced to the dew point of the water in the products of the combustion, thereby producing a wet condition at the cold end of the heat recovery vessel. This wet condition has been found to cause entrapment of a substantial portion of particulates in the exhaust gas stream. This includes particulates from the melting vessel as well as particulates entrained from the batch during preheating. It is preferred to use oxygen wholly or partially in place of air in the combustion means heating the melting vessel, thereby reducing the volume of the exhaust gas stream. The lower exhaust gas volume, in turn, results in a greater concentration of water vapor per unit volume of exhaust gas, less entrainment of batch due to lower velocity of the exhaust gas stream, and a more effective wetting of the batch due to the higher dew point at the higher water vapor concentration.

When the combustion means of the melting vessel is fired with oxygen rather than air, substantial elimination of nitrogen from the exhaust gas stream results. Since nitrogen bubbles are relatively difficult to remove from molten glass, its elimination from the melting vessel is beneficial. Another aspect of the present invention involves an additional benefit from a substantially nitrogen-free exhaust gas stream, whereby preheating of batch materials by direct contact with the substantially nitrogen-free exhaust gas stream results in stripping of air from the batch materials, thereby preventing introduction of entrapped nitrogen into the melter.

Preheating batch materials in accordance with the present invention is particularly advantageous in combination with the ablation enhancing batch liquefying arrangements described in aforesaid U.S. Pat. No. 4,381,934. Preheating batch reduces the heat requirement for liquefying the batch which theoretically should yield a greater throughput of a melter. But this theoretical advantage may not be fully attained in a conventional melter because it has been found that a significant overall rate limiting step is the runoff of liquefied batch from the mass of batch being melted. The batch liquefication arrangements of U.S. Pat. No. 4,381,934 are adapted to enhance this runoff or "ablation" of liquefied batch by providing a sloped melting surface and rapid draining of the liquefied material, and thus these arrangements are particularly suited to take advantage of the higher throughputs that can be achieved by batch preheating. For those embodiments of the present invention that entail oxygen fired combustion, the batch liquefying arrangements of U.S. Pat. No. 4,381,934 are particularly advantageous. In particular, those embodiments wherein a layer of batch encircles the heat source are well suited for use with the high temperatures produced by oxygen fired combustion. Oxygen firing in such an arrangement produces a relatively small volume, high temperature exhaust gas stream compared to a conventional glass melting furnace and this small volume, high temperature exhaust gas stream is particularly well suited for the heat recovery and emissions control purposes of the present invention. Other high temperature heat sources that substantially reduce the volume of nitrogen from the exhaust stream also lend themselves to the present invention.

The batch liquefying arrangements of U.S. Pat. No. 4,381,934 are capable of receiving dry, pulverulent batch materials. Therefore, in accordance with the present invention, dry preheated batch may be fed directly to the liquefying stage.

The invention may also be characterized as a two stage batch liquefaction process wherein batch is transported relatively slowly in a first zone as it is heated to a temperature approaching incipient liquefaction and the batch is then transferred to a second zone where the preheated batch is deposited onto a sloped surface and rapidly liquefied by intense heating, whereby the liquefied batch flows out of the second zone. This process segregates the batch liquefaction operation into a pre-liquefaction stage and a liquefaction stage, and provides each stage with conditions that maximize the efficiency of each stage. In the first zone there are no essential time restraints in transferring heat to the batch as long as the batch remains freeflowing. Therefore, the first zone may be relatively extensive in size, may utilize relatively low grade heat, and preferably provides agitation to the batch in order to heat the batch throughout. The second stage is adapted to apply intense heat to the batch in a relatively small space to rapidly convert the batch to a liquefied state. Support for the batch in the second stage is steeply sloped so as to enhance rapid run-off and high throughput, thereby minimizing the size of the intensely heated zone. The first zone, on the other hand, preferably employs waste heat from the second zone, and therefore batch is conveyed through the first zone preferably at a relatively slow rate so as to maximize transfer of heat from the exhaust gas to the batch. The relatively slow material transport in the first stage can be maintained only so long as the batch remains freeflowing, because when the batch temperature approaches the melting point of one of its constituents the creation of a liquid phase results in cohesion between batch particles, which in turn results in detrimental agglomerating of the batch, which can cause plugging of the first zone and uneven melting in the second zone. Therefore, as the batch approaches this condition the batch is transferred to the steeply sloped support of the second zone and rapidly brought to the liquefied state.

In the preferred embodiment, both stages are rotating vessels. The second stage is characterized by speed of rotation of sufficient magnitude that centrifugal force on the batch is significant and serves to maintain the batch as a lining on the interior of the second stage vessel. The speed of rotation of the first stage vessel, on the other hand, is below that at which centrifugal force on the batch is significant, but merely produces tumbling of the batch. Other distinguishing characteristics of the two stages in at least some of the embodiments are that the first stage is heated primarily by convection, and that the second stage is heated primarily by radiation.

THE DRAWINGS

DETAILED DESCRIPTION

In order to provide a more complete understanding of the invention, a specific preferred embodiment will be described in detail, which embodiment includes a rotary kiln preheater in combination with a rotary liquefying vessel. It should be understood that the concepts of the present invention are not limited to the specific apparatus described and that other preheating means and liquefying means may be employed. Also, while the present invention has been found to be particularly advantageous in the melting of glass and the detailed description will relate specifically to melting glass, the invention may be practiced with other materials that are thermally liquefied from a pulverulent feed material.

Figure 1:
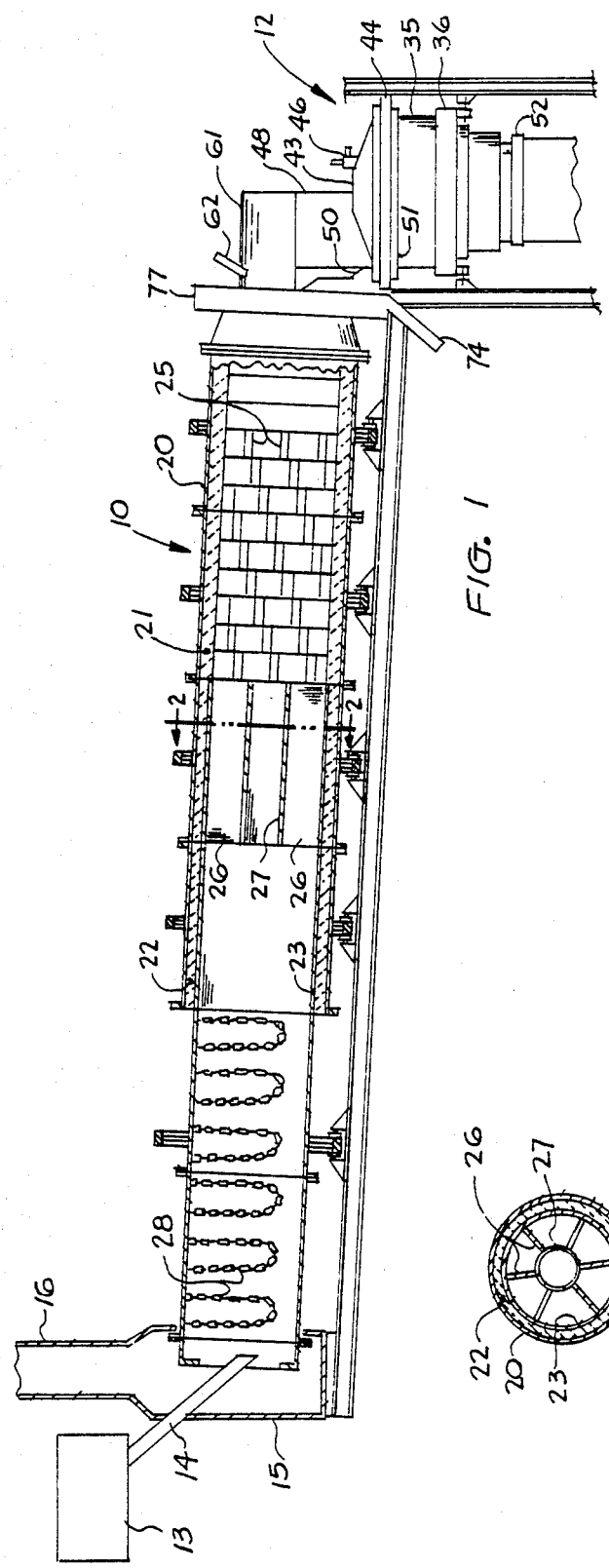
FIG. 1 is a side elevation, partly broken away, of a preferred embodiment of a two-stage batch liquefaction arrangement in accordance with the present invention.

In FIG. 1 there is shown a rotary kiln 10 passing batch and exhaust gases countercurrent to one another and feeding the preheated batch to a liquefaction vessel 12. Batch materials are fed to the inlet or "cold" end of the rotary kiln 10 from a continuous weighing and metering device 13 through a delivery tube 14. A single premixed stream of batch materials may be fed to the metering device 13, or individual constituents may be separately metered and delivered to the inlet of the rotary kiln, since the rotary kiln itself serves as a batch mixer. An example of a batch formula employed in the commercial manufacture of flat glass is the following:

Sand—1,000 parts by weight
soda ash—313.5
limestone—84
dolomite—242
rouge—0.75

Other mineral sources are sometimes employed as alternatives or additives. Commonly, the batch also includes a substantial amount of cullet (scrap glass) typically on the order of 20 to 40 percent of the total batch weight. However, the process and apparatus disclosed can accommodate any amount of cullet, including 100 percent cullet. The above batch formula yields approximately the following glass:

$SiO_2$—73.10 percent by weight
$Na_2O$—13.75 percent
$CaO$—8.85 percent
$MgO$—3.85 percent
$Al_2O_3$—0.10 percent
$Fe_2O_3$—0.10 percent The open end of the rotary kiln at the cold end is enclosed by an exhaust box 15 which directs exhaust gases leaving the rotary kiln to a duct 16. The duct 16 may lead to a fan (not shown) which provides the draft for drawing the exhaust gases through the rotary kiln and for discharging the exhaust gases to the atmosphere through a stack (not shown).

In those embodiments where calcining is to take place in the rotary kiln, the relatively low temperature constituents of the batch, such as the soda ash and the cullet, are not fed to the rotary kiln but are fed directly to the liquefaction vessel 12. Commercially available limestone and dolomite are not chemically pure or uniform, and therefore calcining of limestone and dolomite takes place over a range of temperatures, but a temperature above 1600° F. (870° C.) has been found desirable to effect thorough calcining. Soda ash with a melting temperature of 1564° F. (851° C.) is omitted from the materials passed through the rotary kiln when operating in the calcining mode to avoid melting of the soda ash which would cause the batch particles to adhere to one another. Caustic soda, which is sometimes substituted for soda ash as a source of sodium in glassmaking, likewise has a melting temperature below the preferred calcining temperatures, and thus it is excluded from the materials being fed through the rotary kiln to avoid forming a liquid phase at the hot end thereof when calcining. Calcining has the advantage of reducing the heat load on the liquefaction vessel, but calcining is also advantageous in that it eliminates chemically contained carbon dioxide from the melting materials before the batch materials are liquefied, thereby eliminating generation of carbon dioxide bubbles in molten glass. Accordingly, when the sodium source material is fed separately to the liquefaction vessel, it is preferred to employ the carbon dioxide-free caustic soda source rather than soda ash. Flat glass cullet begins to soften at around 1200° F. (650° C.), and therefore it, too, should bypass the calcining process. On the other hand, sand, the major ingredient of the batch raw materials, may advantageously accompany the limestone and dolomite through the rotary kiln at calcining temperatures. In addition to being preheated, it has been found that the sand assists in keeping the limestone and dolomite in a free-flowing condition. With the sodium source absent, a glass batch may be heated to about 2400° F. (b 1300° C.) without agglomerating the batch.

The rotary kiln 10 is generally of conventional design consisting basically of a cylindrical steel shell 20 mounted for rotation about the cylindrical axis which is inclined slightly from horizontal so as to convey the batch material from the cold end toward the hot end by gravity and tumbling. The residence time of material in the rotary kiln may be related to the basic kiln parameters in accordance with the following empirical relationship:

$$t = 2.28 \, L/NDS$$

where:

t = residence time, minutes
D = diameter, feet
L = length, feet
N = rotational speed, rpm
S = slope, inches per foot.

The residence time in the rotary kiln will depend upon the desired throughput of the melting operation and the amount of heat desired to be transferred from the exhaust gases to the solid materials. From these considerations and the above relationship, a suitable rotary kiln can be designed for the purposes of the present invention.

To prevent heat loss, the rotary kiln 10 is preferably insulated. The insulation may be a refractory wool blanket applied to the exterior of the steel shell 20, or the insulation may be in the form of a ceramic liner on the interior of the shell 20 as shown in portions of the rotary kiln depicted in FIG. 1. The section of the rotary kiln near the hot end is shown provided with a refractory lining 21 which may be preferred for high-temperature durability in the hotter regions of the kiln, particularly when operating at calcining temperatures. Otherwise, it is preferred to provide a layer of insulation 22 between the outer steel casing 20 and an inner steel lining 23 as shown in the middle portion of the rotary kiln of FIG. 1. Where thermal durability is not a concern, the steel lining is preferred for glassmaking because it has less of a tendency to erode contaminating materials into the throughput stream than does a refractory lining.

Figure 2:
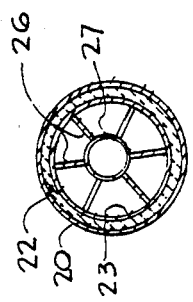
FIG. 2 is a cross-section taken along line 2—2 of FIG. 1.

Heat transfer in the rotary kiln is influenced by agitation of the batch materials which in turn is a function of the speed of rotation of the kiln, and it can be enhanced by the interior construction of the kiln. A wide variety of heat transfer improving baffle means are known to those skilled in the rotary kiln art and may be employed to advantage in the present invention. Several examples are illustrated in FIG. 1. Arranged in spiral fashion around the interior of the kiln near the hot end are a plurality of lifters 25 which are ceramic projections (metal, in the case of a metal-lined section) extending radially inward from the inside walls of the kiln and which serve to lift the batch material and cause it to drop through the hot gases. Another example of a contact area extending arrangement is shown in a center section of the kiln 10 where a plurality of metal plates 26 extend radially between the metal liner 23 and a central tube 27 as can be seen in the cross-sectional view of FIG. 2. The cold end of the kiln is preferably festooned with a plurality of chains 28 which serve to break up any agglomerations of the batch that may occur in that section due to condensation of water vapor, to increase the area for heat exchange and act as wet entrailment collectors. The amount of agitation provided by baffle arrangements or speed of rotation should not be so great as to induce excessive amounts of entrainment of the batch in the exhaust gas stream. Another factor in minimizing entrainment is the diameter of the rotary kiln, which should be of sufficient magnitude to avoid undue gas velocities at anticipated exhaust gas volume flow rates for a given operation.

Figure 3:
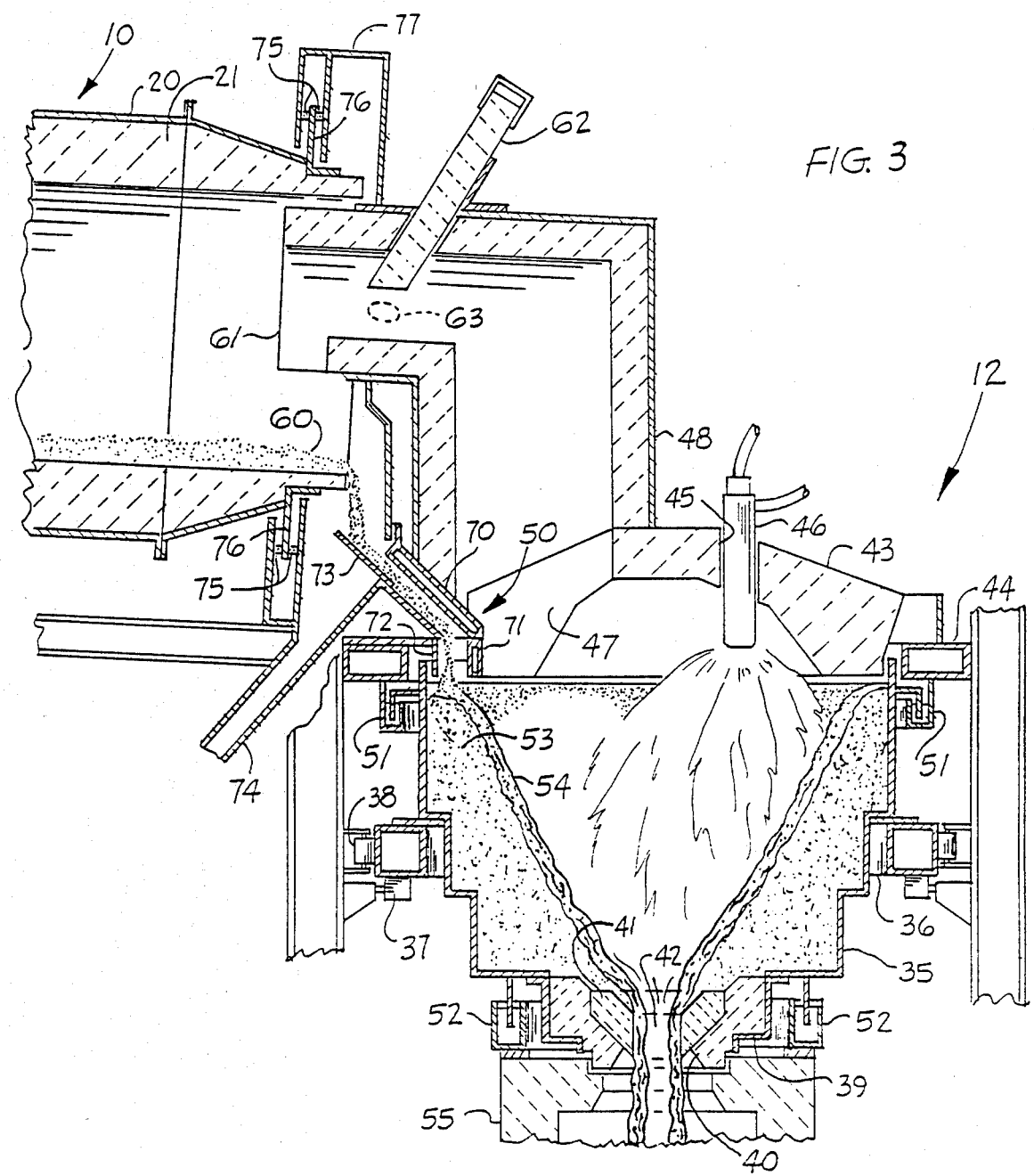
FIG. 3 is an enlarged cross-sectional view of the transition between first and second stages of the arrangement shown in FIG. 1.

The liquefaction stage 12 is of the type disclosed in U.S. Pat. No. 4,381,934, the disclosure of which is hereby incorporated by reference. The preferred embodiment is that in which a stable layer of the batch material is rotated about a heated central cavity with a substantially vertical axis of rotation. The liquefaction means 12 shown here in the drawings is an improved version. The liquefaction vessel comprises a steel drum 35, which as shown in FIG. 3 may be provided with stepped sides so as to decrease the amount of mass being rotated. The drum, however, could have straight cylindrical sides or it could be provided with a conical shape. The drum 35 is supported on a circular frame 36 which is, in turn, mounted for rotation about a generally vertical axis corresponding to the centerline of the drum on a plurality of support rollers 37 and aligning rollers 38. A bottom section 39 houses an outlet assembly which may be detached from the remainder of the drum. The housing 39 may be lined with an annulus of refractory material 40 such as castable refractory cement in which is seated a ring-like bushing 41 of erosion resistant refractory. The bushing 41 may be comprised of a plurality of cut pieces of ceramic. An open center 42 in the bushing 41 comprises the outlet opening from the liquefaction chamber. An upwardly domed refractory lid 43 is provided with stationary support by way of a circular frame member 44. The lid includes an opening 45 for inserting a burner 46. The burner 46 is preferably a wide angled multiport burner and is preferably fired with oxygen and a gaseous fuel such as methane. In order to eliminate carbon dioxide from the system, the burner 46 could be fired with oxygen and hydrogen.

Exhaust gases escape upwardly through an opening 47 through the lid and into an exhaust duct 48. Batch materials may be fed into the liquefaction vessel through the opening 47, and a feed chute 50 is provided for this purpose. Upper and lower water seals 51 and 52, respectively, may be provided to isolate the interior of the liquefaction chamber from the exterior ambient conditions and to trap any dust or vapors that may escape from the vessel.

Within the liquefaction vessel a stable layer of unmelted batch 53 is maintained on the walls of the drum 35 encircling the central cavity within which combustion takes place. The stable layer 53 may be initially established in the desired parabaloid shape by feeding batch into the drum 35 as it rotates without being heated. This initial batch may be wetted with water to assist in establishing the stable layer. During melting, continuous feeding of batch through the chute 50 causes the batch to become distributed over the surface of the stable batch layer as the drum rotates. Heat from the burner 46 causes a transient layer 54 of the batch to become liquefied and to flow on the stable layer 53 downwardly through the bottom opening 42. The liquefied batch then flows out of the liquefaction vessel and may be collected in a vessel 55 below the liquefaction chamber for further processing as needed.

In at least the upper portions of the liquefaction chamber the transient layer of melting batch is supported at an acute angle to vertical. The particulate batch material has a frictional resistance to flowing down the slope, but as soon as the materials become liquefied by the thermal energy this resistance is substantially reduced and the liquefied material immediately flows downwardly and freshly fed batch material takes its place in the transient layer. The rotation of the liquefaction vessel helps maintain the sloped melting surface. The contour of the surface of the stable layer 53 can be estimated from the theoretical relationship between the speed of rotation and the shape assumed by loose dry batch as follows:

$$H = \mu R + (2\pi^2 \omega^2 R^2)/g$$

where:
  H = the elevation of a point on the batch surface in the direction parallel to the axis of rotation;
  R = the radial distance of that point on the axis of rotation;
  $\mu$ = a friction factor;
  $\omega$ = angular velocity; and
  g = the acceleration of gravity.

The friction factor may be taken as the tangent of the angle of repose, which for dry glass batch is typically about 35°. The above equation may be employed to select suitable dimensions for the rotary vessel at a selected speed of rotation, or conversely for determining a suitable speed of rotation for a given vessel.

The liquefied batch of the transient layer 54 flows on a support surface that is comprised substantially of only additional batch materials, and thus contaminating contact with refractories is avoided. Furthermore, because glass batch is a good heat insulator, providing the stable batch layer 53 with sufficient thickness protects any underlying support structure from thermal deterioration. Because the vessel can thus be protected thermally as well as from contact with corrosive molten materials, the materials requirements can be greatly relaxed, even permitting the use of mild steel for the drum 35. The economies thus achieved in furnace construction can be substantial. Furthermore, because the drum 35 is protected by the insulating effect of the stable batch layer, no cooling of the exterior is required, thereby avoiding extraction of useful heat from the melting process. Additionally because the insulating noncontaminating batch lining encircles the heated cavity, heat sources may be employed that operate at considerably higher temperatures than can be used in conventional refractory melting furnaces, e.g., oxygen fired combustion burners, plasma torches or electric arcs.

The temperature in which the batch becomes flowable will depend on the particular batch formula, especially the amount and melting termperature of the lowest melting temperature ingredients. A conventional flat glass batch containing soda ash has been found to liquefy at about 2000° F. (1090° C.) to 2100° F. (1150° C.). The liquefied material drains from the liquefaction vessel as soon as it reaches the fluid state, and therefore the fluid draining from the liquefaction zone has a nearly uniform temperature close to the liquefying temperature of the particular batch formula. Some additional heat is usually imparted to the liquefied material as it is flowing from the vessel, and therefore conventional flat glass batch is found typically to flow from the vessel at a temperature of about 2100° F. (1150° C.) to about 2300° F. (1260° C.). Because heat is transported out of the liquefaction vessel at the liquefying temperature, which is considerably lower than the temperatures attained in a conventional glass melter, the temperature of the liquefaction vessel may be maintained relatively low regardless of the temperature of the heat source. Accordingly, the advantage of greater heat fluxes afforded by higher temperature heat sources can by advantageously employed without providing exotic containment means. The use of the above-noted high temperature heat sources is also advantageous for the sake of reducing the volume of exhaust gases by elimination of airborne nitrogen. The absence of nitrogen also is favorable for preventing nitrogen bubbles in the glass. Optionally, use of a plasma torch with a suitable carrier gas can provide a carbon dioxide-free environment in the liquefaction chamber, particularly in combination with the use of calcined batch. The use of a plasma torch is the subject matter of commonly-assigned U.S. patent application Ser. No. 500,542 filed June 2, 1983, by J. M. Matesa. A carbon dioxide-free environment may also be provided by the combustion of oxygen and hydrogen. Another advantage of nitrogen elimination is that the emissivity (i.e., the efficiency with which a gas radiates its thermal energy) of nitrogen is much lower than the emissivity of carbon dioxide and water. Therefore, excluding nitrogen avoids diluting the carbon dioxide and/or water produced by the combustion and intensifies the release of energy. It should be understood that the benefits of nitrogen exclusion can be attained by degrees, and that partial exclusion can yield useful improvements.

It is desirable for the thermal conductivity of the material employed as the stable layer 53 to be relatively low so that practical thicknesses of the layer may be employed while avoiding the need for wasteful forced cooling of the vessel exterior. In general, granular or pulverulent mineral source raw materials provide good thermal insulation, but in some cases it may be possible to use an intermediate or product of the melting process as a non-contaminating stable layer, e.g., in a glassmaking process pulverized cullet (scrap glass) could constitute the stable layer although a thicker layer would be required due to the higher conductivity of glass as compared to glass batch. In metallurgical processes on the other hand, using a metallic product as the stable layer would entail unduly large thicknesses to provide thermal protection to the vessel, but some ore materials may be satisfactory as insulating layers. The stable layer is preferably of essentially the same composition as the material being processed. However, it should be understood that precursor or derivative materials would be considered "essentially the same composition" in this context. In other words, the stable layer could be the raw material, the product material, an intermediate or a different form or mixture thereof as long as it melts or reacts to form a substance that does not introduce significant amounts of foreign constituents into the throughput stream. It should also be evident that this compositional requirement of the stable layer need apply only to surface portions that actually contact the throughput stream and to portions just under the surface that may occasionally erode into the throughput stream. Therefore, an equivalent arrangement might employ a different material in portions of the stable layer below the level at which erosion is likely to occur. Since this subsurface portion would serve primarily as insulation to protect the vessel, it could be composed of a material selected for its thermal insulating properties (e.g., sand or ceramic particles) although it should be sufficiently compatible compositionally to not contaminate the surface layer at the temperatures involved.

It should be understood that the terms "transient" and "stable" are relative, and that a distinct physical demarcation between the transient and stable layers may not always be identifiable. The use of the terms "transient" and "stable" is not intended to preclude the possibility that minor fluctuation of the interface therebetween may occur. The basic distinction is that the region that is described as the transient layer is characterized by melting and flowing, whereas the region termed the stable layer, in at least its major portion, does not participate in the melting and flowing of the throughput stream. Although the transient layer is said to be on the stable layer, one might theoretically define an intermediate layer therebetween, and it should be understood that that possibility is intended to be included.

In some cases the preheated batch could be fed directly from the exit of the rotary kiln 10 into the liquefaction chamber 12, but the arrangment of FIG. 3, wherein the rotary kiln and the liquefaction vessel are somewhat separated from each other, is preferred. Putting the end of the rotary kiln in direct communication with the opening 47 of the liquefaction vessel has been found to cause caking of batch in the rotary kiln, probably due to radiant energy from the liquefaction vessel overheating the batch materials in the rotary kiln. This problem is overcome by providing a transition between the rotary kiln and the liquefaction chamber which comprises the chute 50 to carry batch therebetween and a nose piece extension 61 of the exhaust duct 48. The nose piece 61 directs the exhaust gases into an upper portion of the rotary kiln away from the glass batch 60 and serves to shade the rotary kiln from radiant heat transfer from the liquefaction vessel. An adjustable damper 62 may be provided in the exhaust passage of the transition section for the purpose of controlling the pressure in the liquefaction chamber. In the event that boosting the temperature of the exhaust gas is required for calcining the batch materials in the rotary kiln, the nose piece 61 may be provided with openings 63 (shown in phantom in FIG. 3) for inserting auxiliary burners 64 (shown in FIG. 4).

The batch chute 50 may be provided with a cool front plate 70 facing the exhaust gas stream so as to prevent the batch from becoming overheated and plugging the chute. Other features of the batch chute 50 include a pivotable water-cooled baffle 71 at the exit end of the chute, which serves to adjustably direct the falling batch onto the desired portion of the stable batch layer 53 in the liquefaction chamber. A ceramic plate 72 may also be provided at the exit end of the chute 50 so as to direct the falling batch away from the upper rim area of the drum 35. In the event of an emergency need to stop feeding batch material to the liquefaction chamber, a pivotable diverting gate 73 is provided at the entrance to the batch chute 50 and can be employed to divert the batch coming from the rotary kiln to an escape chute 74. A seal between the rotary kiln and the transition section may be provided by Teflon synthetic polymer or graphite seals 75 bearing against a circular fin 76 extending radially from the rotary kiln shell 20. The seal arrangement may be enclosed by an annular housing 77.

Figure 4:
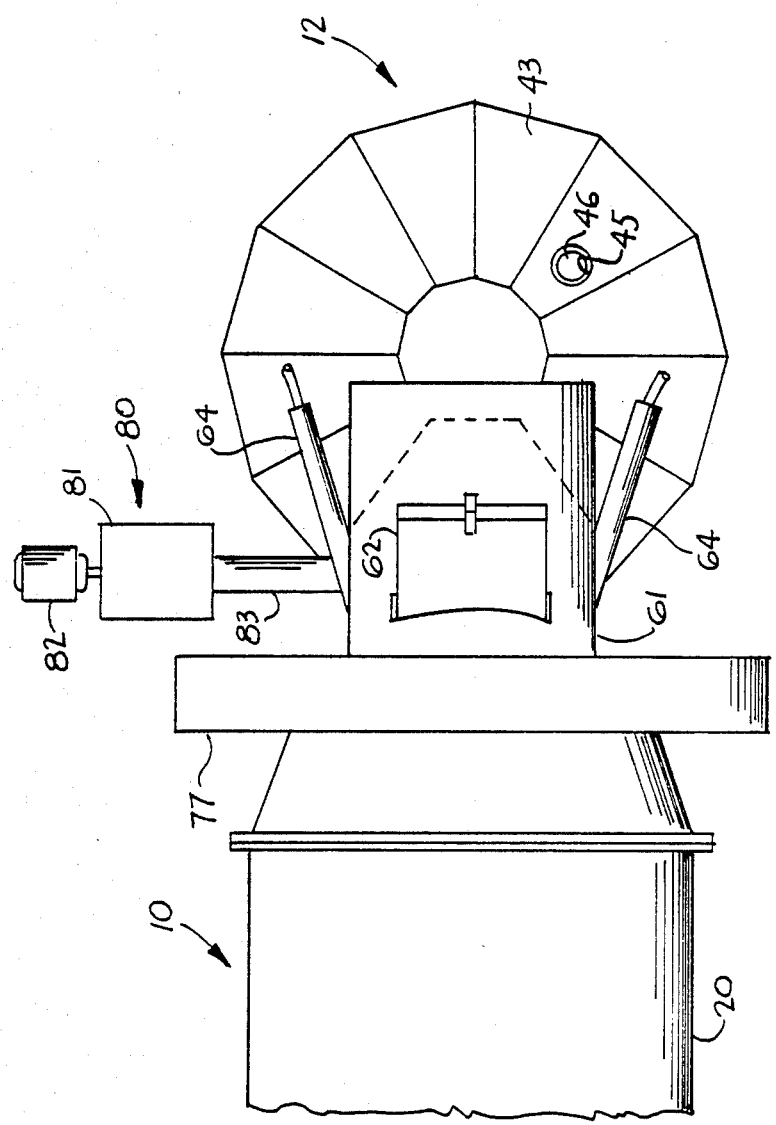
FIG. 4 is a top elevational view of the arrangement of FIG. 3 having elements removed for clarity.

Referring to FIG. 4 there is shown an auxiliary feeder 80 which may be provided to feed materials to the liquefaction chamber 12 which have not been preheated or have been preheated independently from the batch being preheated in the rotary kiln 10. For example, the auxiliary feeder 80 may be used to feed soda ash, caustic soda or cullet to the liquefaction chamber, particularly when the kiln is being used to calcine the calcium and-/or magnesium carbonates. The auxiliary feeder 80 may be a conventional screw-type feeder comprised of a hopper 81, motor 82, and screw barrel 83 and may deposit materials through the opening 47 in the liquefaction chamber lid onto the upper edge of the stable batch layer 53. A plurality of auxiliary feeders similar to the feeder 80 may be employed if it is desired to feed a plurality of diverse materials separately at the entrance of the liquefaction chamber.

The slope of the rotary kiln may be selected in accordance with the desired residence time of the material in the rotary kiln, and appropriate support means could be provided to make the angle variable. However, it is preferred to provide a fixed inclination of about 2° (1° to 5°) with respect to horizontal and to control the residence time by varying the speed of rotation of the rotary kiln. The speed of rotation of the rotary kiln is in the range where the batch material tumbles in a lower portion of the rotary kiln without significant portions of the batch being carried by centrifugal force around the inner circumference of the kiln.

Glass batch at the hot end of the rotary kiln, when preheated to about 900° F. (480° C.), assumes a semi-tacky condition that resists dusting. Up to a temperature of about 1400° F. (760° C.) this tackiness does not lead to undesirable agglomerating or plugging. Glass batches without soda ash or an equivalent sodium source attain a similar condition when heated to the vicinity of the calcining temperature of the limestone and dolomite. This tacky condition is advantageous for feeding the batch to the liquefaction chamber with very little dusting. Also, it is advantageous that the onset of this tacky condition corresponds with the transfer of the batch from a substantially horizontal support in the rotary kiln to a nearly vertical support in the liquefaction chamber thereby assuring a continuous and uniform flow of material through the system.

The following is an example of an arrangement substantially as shown in the drawings and described hereinabove, wherein standard flat glass batch including soda ash was processed at a rate of 30 tons per day (27 metric tons per day). The rotary kiln was 49 feet (15 meters) in length and had an inside diameter of 2.5 feet (76 centimeters). The internal area of the kiln was 502 square feet (46.6 square meters). The rotary kiln was rotated at about 3 rpm and had an incline of 2°. The liquefaction vessel had an inside diameter of 51 inches (130 centimeters) and was rotated at about 32 rpm. The liquefaction chamber was heated by a burner fueled with methane and oxygen to produce a heat input of about 3 million BTU per hour (0.878 million watts) which produced an exhaust gas volume at standard temperature and pressure of 33,792 cubic feet per hour (957 cubic meters per hour). The exhaust gas entered the rotary kiln at 1631° F. (888° C.) and left the rotary kiln at 474° F. (246° C.). The glass batch was fed into the rotary kiln at 60° F. (16° C.) and was heated to 1100° F. (593° C.) in the rotary kiln. Liquefied batch flowing from the liquefaction chamber was at a temperature of 2257° F. (1236° C.).

Other modifications and variations as would be obvious to those of skill in the art may be resorted to without departing from the scope of the invention as defined by the claims which follow.

I claim:

1. A method of liquefying pulverulent batch materials comprising: passing pulverulent batch materials into a preheating vessel, in the preheating vessel exposing the batch materials to hot gas while agitating the batch materials so as to heat the batch materials, passing the heated batch materials from the preheating vessel into a liquefying vessel and depositing the heated, pulverulent batch materials onto a stable sloping layer of batch encircling a cavity within the liquefying vessel, providing combustion heat within the cavity to partially liquefy the deposited pulverulent batch materials and to permit the partially liquefied batch to flow over the stable batch layer to an exit opening from the liquefying vessel, balancing the rate of heating in the liquefying vessel and the rate at which the batch materials are fed into the liquefying vessel so as to maintain the stable batch layer substantially constant, and passing products of combustion from the liquefying vessel to the preheating vessel.

2. The method of claim 1 wherein the pulverulent batch materials are glass batch materials.

3. The method of claim 1 wherein combustion heat is provided to the cavity of the liquefying vessel by means of substantially nitrogen-free combustion of fuel with oxygen.

4. The method of claim 3 wherein the products of combustion are permitted to cool in the preheating vessel to the dew point of water vapor contained therein.

5. The method of claim 1 wherein agitating the batch materials in the preheating vessel comprises tumbling the batch materials along the interior of an inclined rotating kiln.

6. The method of claim 5 wherein the slope of the rotary kiln is slight with respect to horizontal and the batch materials deposited onto the stable layer of batch within the liquefying vessel are supported at least initially on a steep slope.

7. The method of claim 6 wherein transfer of the batch material from the preheating vessel to the liquefying vessel takes place when melting of the batch has begun but before substantial adherence between batch particles has developed.

8. The method of claim 1 wherein the stable layer is a surface of revolution and is rotated about the cavity.

9. The method of claim 1 wherein the batch materials are fed to the preheating vessel in a substantially dry, free-flowing condition.

10. The method of claim 2 wherein the batch materials include cullet.

11. A method of liquefying pulverulent batch comprising: passing pulverulent batch materials through a preheating vessel and into a liquefying vessel, providing heat to the liquefying vessel to liquefy the batch therein by combustion of hydrogen-containing fuel and oxygen in the substantial absence of nitrogen, passing the exhaust gas stream from the combustion to the preheating vessel, contacting the batch materials with the exhaust gas stream in the preheater so as to transfer heat from the exhaust gas to the batch materials, and discharging the exhaust gas from the preheating vessel after the exhaust gas is below the dew point of water vapor in the exhaust gas stream so that water vapor condenses on batch in the preheating vessel.

12. The method of claim 11 wherein the combustion in the liquefying vessel takes place in a cavity encircled by a stable layer of batch material.

13. The method of claim 12 wherein the preheating vessel comprises a rotary kiln.

14. The method of claim 11 wherein combustion in the liquefying vessel produces exhaust substantially free of carbon dioxide.

15. The method of claim 14 wherein hydrogen is combusted.

16. The method of claim 11 wherein the preheating vessel is a rotary kiln.

17. The method of claim 12 wherein the layer of batch is rotated about the cavity.

18. The method of claim 17 wherein the rotation is about a substantially vertical axis.

19. The method of claim 11 wherein batch is passed from the preheating vessel to the liquefying vessel in a dry, free-flowing, pulverulent condition.

20. The method of claim 11 wherein the batch is a glass batch.

21. The method of claim 20 wherein the batch includes cullet.

22. A method of liquefying pulverulent batch material comprising: feeding batch material to a first heating zone, where the batch material is agitated as it is heated, and conveying the batch material through the first heating zone at a slight angle to horizontal; removing from the first heating zone pulverulent batch material that has been heated to a temperature below that at which a melted phase causes adherence of batch particles to one another, and depositing the heated pulverulent batch materials onto a support at a steep slope in a liquefying zone and rapidly increasing the rate of heat transfer to the deposited batch to raise its temperature to render it to a partially liquefied condition, whereupon the partially liquefied batch flows out of the liquefying zone.

23. The method of claim 22 wherein heat is provided to the liquefying zone by a combustion heat source, and exhaust from the combustion heat source is passed from the liquefying zone to the first heating zone.

24. The method of claim 22 wherein the combustion in the liquefying zone entails combustion of fuel with oxygen in the substantial absence of nitrogen.

25. The method of claim 22 wherein the combustion takes place in the liquefying zone in a cavity encircled by a stable layer of batch material.

26. The method of claim 25 wherein the layer is rotated about the cavity.

27. The method of claim 26 wherein the rotation is about a substantially vertical axis.

28. The method of claim 27 wherein the batch is tumbled in a rotary kiln as it is heated in the first heating zone.

29. The method of claim 22 wherein the batch is tumbled in a rotary kiln as it is heated in the first heating zone.

30. The method of claim 22 wherein the batch is glass batch.

31. The method of claim 30 wherein the glass batch includes soda ash and the transfer from the first heating zone to the liquefying zone takes place when the batch has attained a temperature of about 900° F. (480° C.) to 1400° F. (760° C.).

32. The method of claim 30 wherein the batch includes cullet.

33. A method of liquefying pulverulent batch material comprising: tumbling the batch material as it is heated in a first stage heating vessel by rotating the first stage heating vessel at a speed that imparts insufficient centrifugal force to the batch material to overcome gravity, prior to liquefaction of the batch material passing the heated pulverulent batch to a second stage heating vessel, heating the second stage heating vessel to partially liquefy the batch therein, and rotating the second stage heating vessel at a speed sufficient to retain a lining of batch materials on interior walls of the second stage heating vessel by centrifugal force and about an axis of rotation sufficiently vertical that partially liquefied batch flows off the lining and out of the second stage heating vessel before melting of the batch material is completed.

34. The method of claim 33 wherein the first stage heating vessel comprises a rotary kiln.

35. The method of claim 33 wherein the batch material lining in the second stage heating vessel is retained encircling a heated cavity.

36. The method of claim 35 in which the batch material lining is rotated about a substantially vertical axis.

37. The method of claim 33 wherein the batch is passed from the first stage to the second stage in a dry, free-flowing, pulverulent condition.

38. The method of claim 33 wherein the batch is a glass batch.

39. The method of claim 38 wherein the batch includes cullet.

40. The method of claim 33 wherein the second stage is heated by combustion of fuel with oxygen in the substantial absence of nitrogen.

41. The method of claim 33 wherein heating in the first stage is primarily convective, and heating in the second stage is primarily radiant.

42. Apparatus for liquefying pulverulent batch materials comprising: rotary kiln means comprising an elongated inclined cylindrical vessel adapted for rotation about its cylindrical axis angled slightly from horizontal, means for feeding pulverulent batch materials to a first end of the rotary kiln, batch liquefying means at the opposite end of the rotary kiln, the liquefying means including a cavity extending along a substantially vertical axis to a bottom outlet opening and encircled by a lining of batch material having steeply sloped surface portions facing the cavity, means to heat the cavity, and an upper inlet opening for depositing batch from the rotary kiln onto the lining.

43. The apparatus of claim 42 wherein the batch liquefying apparatus is mounted for rotation about a substantially vertical axis.

44. The method of claim 8 wherein the rotation is about a substantially vertical axis.

45. The method of claim 44 wherein the rotation is of sufficient speed to maintain the slope of the stable layer steeper than the natural angle of repose of the batch material comprised the layer.

* * * * *